P. E. HOLT.
PLOWING MACHINE.
APPLICATION FILED APR. 21, 1909.
985,805.
Patented Mar. 7, 1911
2 SHEETS—SHEET 2.
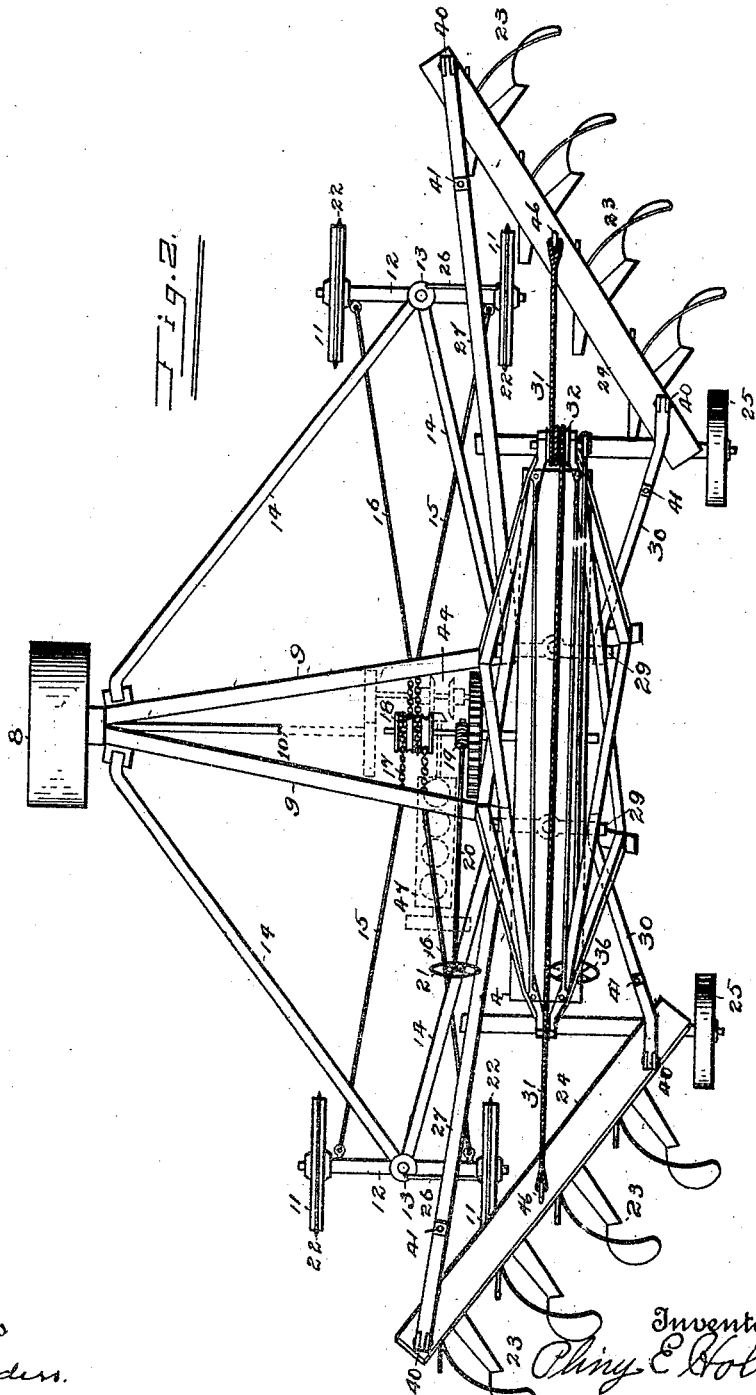
Witnesses
Inventor
Pliny E. Holt.
by Baldwin Yale
Attorney

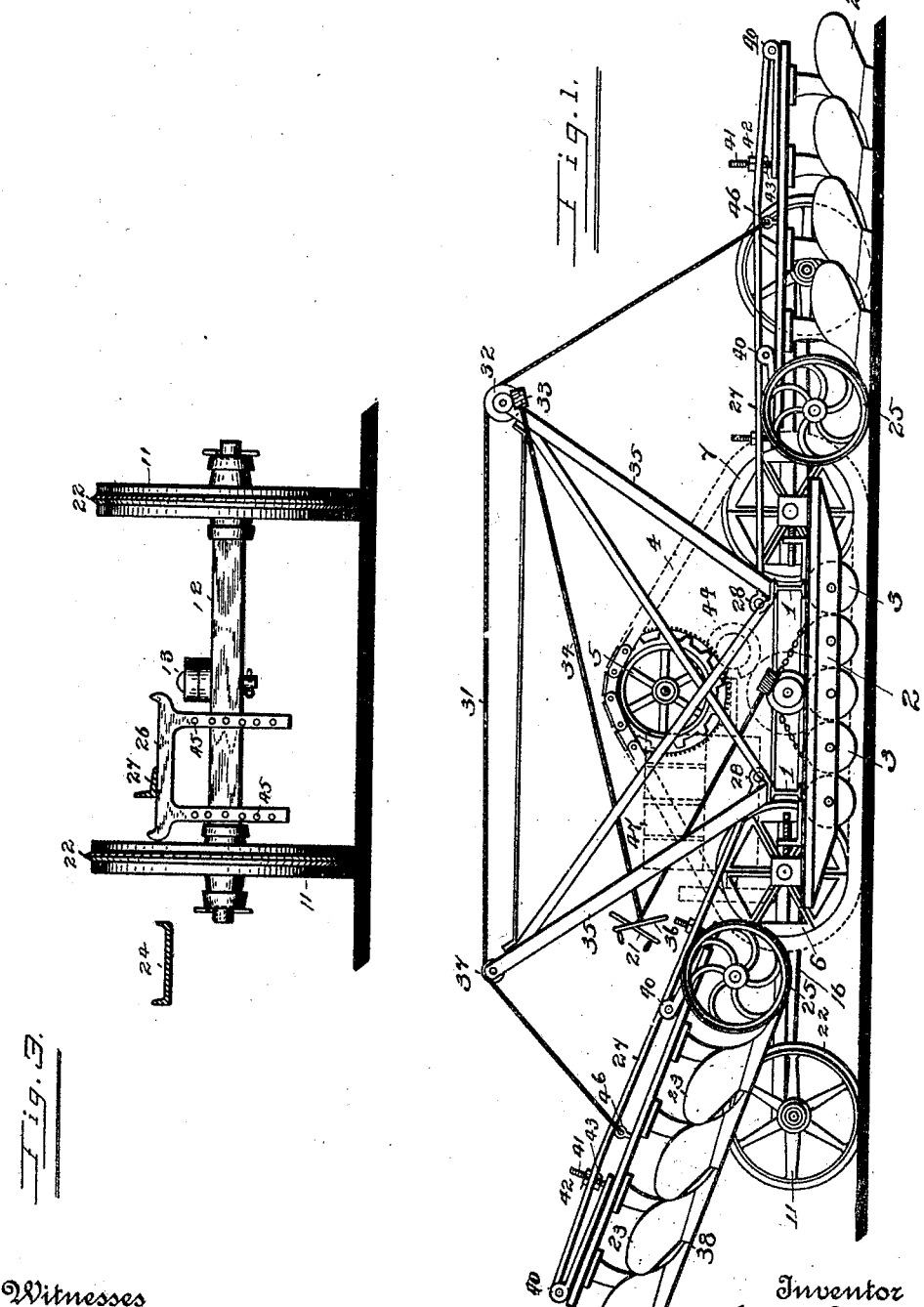

UNITED STATES PATENT OFFICE.

PLINY E. HOLT, OF STOCKTON, CALIFORNIA.

PLOWING-MACHINE.

985,805.  Specification of Letters Patent.  Patented Mar. 7, 1911.

Application filed April 21, 1909. Serial No. 491,378.

*To all whom it may concern:*

Be it known that I, PLINY E. HOLT, a citizen of the United States, and residing at 836 West Poplar street, in the city of Stockton, county of San Joaquin, and State of California, have invented certain new and useful Improvements in Plowing-Machines; and I do hereby declare the following to be a full, clear, and exact description of the said invention, such as will enable others skilled in the art to which it most nearly appertains to make, use, and practice the same.

This invention relates to improvements in plowing machines, and particularly to that class of plowing machines wherein the plows and the traction mechanism therefor are combined in one machine.

The object sought to be accomplished is to provide a self-propelled plowing machine capable of propelling itself back and forth across the field, and having two sets of plow gangs capable of being raised and lowered and both adapted to throw their furrows in the same lateral direction.

Broadly, the invention consists of a primary tractor located on one side of the machine and consisting of a traction belt, a driving means therefor, a supporting truck having rollers journaled therein and adapted to travel over the traction belt and support the main tractor frame; a secondary or auxiliary traction mechanism located on the opposite side of the machine and mounted on an outrigger frame; a suitable power unit adapted to drive both traction mechanisms; supporting and steering wheel trucks adapted to partially support the plow gangs and pivoted to the main frame and cross connected with each other through a suitable steering mechanism; and a raising and lowering mechanism for raising and lowering the plow gangs into and out of the operative position.

In the drawings: Figure —1— is a side elevation of a plowing machine drawn to illustrate this invention. Fig. —2— represents a plan view from above of the same. Fig. —3— is a front elevation illustrating one of the steering trucks.

In detail, the construction consists of a main tractor frame composed of the main beams 1 resting upon the supporting truck 2, in which the supporting rollers, 3, are journaled. The prime tractor consists of the traction belt 4 driven by the sprocket 5 from which the traction belt extends around and beneath the idle sprocket 6 mounted in one end of the supporting truck, thence under the supporting rollers 3, thence around the idle sprocket 7 mounted in the opposite end of the supporting truck, thence back to the driving sprocket mounted upon the main frame and suitably geared to the motive unit 47. The secondary tractor consists of the concentric wheel 8 mounted on the outrigger frame 9 and driven by the shaft 10 through a reducing gear by the motive unit 47; or by a traction mechanism similar to the primary tractor. The primary and secondary tractors are synchronously driven so as to hold the tractor in its course.

The supporting and steering trucks consist of the flanged wheels 11 mounted upon the axles 12 pivoted at 13 in the outboard frame 14 fixed on the main frame. The axles 12 are cross-connected on opposite sides of the center by the rods 15 and 16 which are provided at their centers with flexible chains, 17, wrapped around the drum 18, which is rotated by a worm gear, 19, fixed upon the steering column 20 provided with the hand wheel 21. The wheels 11 are provided with the flanges 22, which are adapted to sink into the ground to prevent side slip. Through the use of the cross-connections the steering trucks are readily controlled and it is possible to swing the machine within a minimum of space.

The plow gangs consist of a series of plow bottoms, 23, mounted in gangs in the usual manner on oblique plow beams, 24, supported on the furrow, or outer, side by the furrow wheels, 25, and supported on the inner side by adjustable supports, 26, fixed to the axles 12. These supports, 26, support reach bars, 27, pivotally attached at one end to the forward ends of the oblique plow beams, as at 40, and pivoted at the other end to the main frame, as at 28. The furrow ends of the plow beams are similarly pivoted to the main frame, as at 29, by reach bars, 30.

To enable the machine to plow back and forth across the field without turning the tractor about, two sets of plow gangs, exactly alike in construction and support, are provided at opposite ends of the machine. These plow gangs are alternately raised and lowered by the cable 31, the ends of which are attached to the plow beams, as at 46, and the intermediate portion of which is given several turns about the winch 32, which is operated by the worm gear 33 on the shaft 34 mounted on the superstructure 35 and provided with the hand wheel 36. The cable 31 traveling over the idler 37 and the winch 32 is of such length that only one gang of plows can be in the operative position at any one time.

The suction of the plow points (that is the angle from the point 38 to the heel 39) is controlled by the reach rods 27 and 30 pivoted to the plow beam at 40, and provided with the screw adjustment 41 passing therethrough and provided with the running nuts 42 and 43 thereon, between which the reach rods are locked in position to give the proper downward slant or suction to the plow points. This suction may be varied to suit the quality of the soil to be plowed, and may be adjusted to conform to the depth to which the plow penetrates into the soil.

In operation, supposing the machine to be advancing to the left as illustrated in Fig. 1, the machine traverses the field leaving four open furrows (or more or less depending upon the number of plows in the gang) in its wake. Having completed its travel in this direction, the plows are raised out of operative position by the manipulation of the winch 32. The tractor, controlled by the steering gear, is then advanced to the right until the distance advanced equals the width of the furrows just opened. In this position the other gang of plows is lowered into operative position, the reverse gear 44 is thrown into reverse engagement, and the tractor travels back across the field over a new course parallel to the course of the first trip, and turning up furrows equal in width to those previously plowed and throwing them in the same lateral direction. While the tractor is coming into position or maneuvering in its course, the reach rod 27 is free to slide laterally on the support 26, whereby the course of the tractor can be altered or corrected without seriously affecting the course of the operative plow gang. The support 26 is provided with a series of holes, 45, which admit of vertical adjustment to regulate the depth to which the plow bottoms are permitted to penetrate into the soil. After having traversed in this wise the land to be plowed, the land at the end of the series of furrows remains unplowed because of the space required for maneuvering the tractor at the end of each trip. The plowing machine may then be thrown into a position to make sufficient trips across the ends of the furrows to plow the remaining unplowed land. The location of the plow gang on the machine is such that it is possible to run parallel and very close to a fence or a given line.

It is obvious that traction means other than those herein described may be used in this combination; or that disk plows or other cultivating means may be substituted for the plow bottoms herein illustrated; or that various changes may be made without materially departing from the spirit of this invention. It is apparent also that this machine may be built so as to include but one plow gang, though in so doing its effectiveness will be greatly limited. It has heretofore been the practice in the use of double plows (that is to say two sets of plows adapted to throw their furrows in the same lateral direction) to mount the same upon supporting trucks which are towed back and forth across the land by a cable operated by windlasses on opposite sides of the land.

Having thus described this invention what is claimed and desired to be secured by Letters Patent is:—

1. A plowing machine comprising a frame, steering trucks therefor, traction mechanism for driving said frame, plow beams located at each end of said frame and provided with reach bars connected to said frame, said reach bars being slidingly supported by said trucks, means for steering said trucks, and means for raising and lowering said plow beams.

2. A plowing machine comprising a frame, steering trucks therefor, traction mechanism for driving said frame, plow beams located at each end of said frame and provided with reach bars connected to said frame, means carried by said trucks for slidingly supporting said reach bars, means for steering said trucks, and means for raising and lowering said plow beams.

3. A plowing machine comprising a frame, steering trucks therefor, traction mechanism for driving said frame, plow beams located at each end of said frame and provided with reach bars connected to said frame, supports adjustably mounted in said trucks and upon which said reach bars rest, means for steering said trucks, and means for raising and lowering said plow beams.

4. A plowing machine comprising a frame, steering trucks therefor, traction mechanism for driving said frame, plow beams located at each end of said frame and provided with reach bars connected to said frame, supports for said reach bars carried by said trucks, said supports being provided with means to limit the lateral movement of said reach bars, means for steering said trucks, and means for raising and lowering said plow beams.

5. A plowing machine comprising a frame, steering trucks therefor, traction mechanism for driving said frame, plow beams located at each end of said frame, reach bars pivotally connected to said plow beams and also to said frame, said reach bars being slidingly supported by said trucks, means for steering said trucks, and means for raising and lowering said plow beams.

6. A plowing machine comprising a frame, steering trucks therefor, traction mechanism for driving said frame, plow beams located at each end of said frame, reach bars pivotally connected to said plow beams and also to said frame, said reach bars being slidingly supported by said trucks, steering mechanism for simultaneously steering both of said trucks, and means for raising and lowering said plow beams.

7. A plowing machine comprising a frame, steering trucks therefor, traction mechanism for driving said frame, plow beams located at each end of said frame, reach bars pivotally connected to said plow beams and also to said frame, said reach bars being slidingly supported by said trucks, means for adjusting said reach bars with relation to said plow beams to vary depth of penetration of the plows, means for steering said trucks, and means for raising and lowering said plows.

8. The combination with a frame provided with spaced apart steering trucks, and plow beams located at each end of said frame and provided with reach bars connected to the frame and slidingly supported by said trucks, of means for steering said trucks, means for raising and lowering said plow beams, and traction mechanism comprising a primary traction belt on one side of said frame, a concentric wheel on the other side of said frame, and means for driving said belt and wheel in unison.

9. The combination with a frame provided with spaced apart steering trucks, and plow beams located at each end of said frame and provided with reach bars connected to the frame and slidingly supported by said trucks, of means for steering said trucks, means for raising and lowering said plow beams, and traction mechanism comprising a primary traction belt on one side of said frame, an outboard structure extending from the other side of said frame, a wheel mounted in said outboard structure and concentric with said belt, and means for driving said wheel and belt in unison.

10. The combination with a frame provided with spaced apart steering trucks, and plow beams located at each end of said frame and provided with reach bars connected to the frame and slidingly supported by said trucks, of means for steering said trucks, means for raising and lowering said plow beams, and traction mechanism comprising a primary traction belt on one side of said frame, an outboard structure to which said steering trucks are pivotally connected, a traction wheel mounted in said outboard structure, and means for driving said wheel and belt in unison.

11. A plowing machine comprising a frame, steering trucks located at opposite ends of said frame, plow beams also located at opposite ends of said frame, means for raising and lowering said plow beams, traction mechanism for driving said frame, and means for simultaneously steering said trucks.

12. A plowing machine comprising a frame, steering trucks located at opposite ends of said frame, plow beams also located at opposite ends of said frame, means for raising and lowering said plow beams, traction mechanism for driving said frame, cross connecting means for said trucks comprising rods connected by flexible members, and means engaging said flexible members for operating said trucks.

In testimony whereof, I have hereunto set my hand this 26th day of March 1909.

PLINY E. HOLT.

Witnesses:
P. S. SAUNDERS,
C. J. SMITH.